US009092424B2

(12) United States Patent
Nie et al.

(10) Patent No.: US 9,092,424 B2
(45) Date of Patent: Jul. 28, 2015

(54) WEBPAGE ENTITY EXTRACTION THROUGH JOINT UNDERSTANDING OF PAGE STRUCTURES AND SENTENCES

(75) Inventors: Zaiqing Nie, Beijing (CN); Yong Cao, Beijing (CN); Ji-Rong Wen, Beijing (CN); Chunyu Yang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1204 days.

(21) Appl. No.: 12/569,912

(22) Filed: Sep. 30, 2009

(65) Prior Publication Data
US 2011/0078554 A1    Mar. 31, 2011

(51) Int. Cl.
G06F 17/00 (2006.01)
G06F 17/27 (2006.01)

(52) U.S. Cl.
CPC .................... *G06F 17/278* (2013.01)

(58) Field of Classification Search
CPC ...................................... G06F 17/278
USPC ........................................ 715/234
See application file for complete search history.

(56) References Cited

U.S. PATENT DOCUMENTS

| | | | |
|---|---|---|---|
| 6,493,706 B1 * | 12/2002 | Mead et al. ............................ | 1/1 |
| 7,065,483 B2 | 6/2006 | Decary et al. | |
| 7,383,254 B2 | 6/2008 | Wen et al. | |
| 7,529,761 B2 * | 5/2009 | Wen et al. ............................ | 1/1 |
| 7,660,804 B2 * | 2/2010 | Wen et al. .................. | 707/999.1 |
| 7,720,830 B2 * | 5/2010 | Wen et al. ...................... | 707/705 |
| 8,090,583 B1 * | 1/2012 | Bangalore et al. ............ | 704/270 |
| 2003/0005045 A1 * | 1/2003 | Tanimoto ....................... | 709/203 |
| 2005/0182736 A1 * | 8/2005 | Castellanos ..................... | 705/80 |
| 2006/0123000 A1 | 6/2006 | Baxter et al. | |
| 2008/0027969 A1 | 1/2008 | Wen et al. | |
| 2008/0046441 A1 * | 2/2008 | Wen et al. ...................... | 707/100 |
| 2008/0141230 A1 * | 6/2008 | Rowlett et al. ................ | 717/143 |
| 2009/0055183 A1 * | 2/2009 | Yakhnenko et al. ....... | 704/256.5 |
| 2009/0182759 A1 | 7/2009 | Kirpal | |
| 2009/0222799 A1 * | 9/2009 | Stewart et al. ................ | 717/143 |

OTHER PUBLICATIONS

Zhu et al. "Simultaneous Record Detection and Attribute Labeling in Web Data Extraction", 2006, 10 pages, URL:<http://research.microsoft.com/pubs/70300/tr-2006-69.pdf>.*

(Continued)

*Primary Examiner* — Scott Baderman
*Assistant Examiner* — Mustafa Amin
(74) *Attorney, Agent, or Firm* — Steve Wight; Judy Yee; Micky Minhas

(57) ABSTRACT

Described is a technology for understanding entities of a webpage, e.g., to label the entities on the webpage. An iterative and bidirectional framework processes a webpage, including a text understanding component (e.g., extended Semi-CRF model) that provides text segmentation features to a structure understanding component (e.g., extended HCRF model). The structure understanding component uses the text segmentation features and visual layout features of the webpage to identify a structure (e.g., labeled block). The text understanding component in turn uses the labeled block to further understand the text. The process continues iteratively until a similarity criterion is met, at which time the entities may be labeled. Also described is the use of multiple mentions of a set of text in the webpage to help in labeling an entity.

20 Claims, 5 Drawing Sheets

(56) References Cited

OTHER PUBLICATIONS

Yang et al. "Closing the Loop in Webpage Understanding", May 2010, pp. 1-14, URL<http://research.microsoft.com/pubs/143863/TKDE2009_Yohn.pdf>.*

Yang et al. "Closing the Loop in Webpage Understanding", Oct. 2008, pp. 1397-1398, URL: <http://delivery.acm.org/10.1145/1460000/1458298/p1397-yang.pdf?ip=151.207.242.4&acc=ACTIVE%20SERVICE&CFID=206348391&CFTOKEN=66892095&_acm_=1353449121_43ceb6aabf1740ec5a390f7e02c2c95f>.*

Zhu et al. "2D conditonal Random fields for web information extraction", 2005, pp. 1-8, URL:<http://research.microsoft.com/en-us/um/people/znie/icml2005_2d-crf.pdf>.*

Zhu, et al., "Webpage Understanding: An Integrated Approach", Retrieved at <<http://research.microsoft.com/en-us/um/people/znie/SIGKDD2007_extraction.pdf>>, 2007, pp. 903-912.

Etzioni, et al., "Unsupervised Named-Entity Extraction from the Web: An Experimental Study", Retrieved at <<http://talshaked.com/papers/KnowItAll_AIJ.pdf>>, vol. 165, No. 1, Nov. 1 2004, pp. 44.

Phan, et al.,"Automated Data Extraction from the Web with Conditional Models", Retrieved at <<http://citeseerx.ist.psu.edu/viewdoc/download?doi=10.1.1.109.4191&rep=rep1&type=pdf>>, vol. 1, No. 2, 2005, pp. 194-209.

Sarawagi, et al., "Semi-Markov Conditional Random Fields for Information Extraction", Retrieved at <<http://citeseerx.ist.psu.edu/viewdoc/download?doi=10.1.1.128.3524&rep=rep1&type=pdf>>, 2004, pp. 1185-1192.

Kayed, et al.,"FiVaTech: Page-Level Web Data Extraction from Template Pages", Retrieved at <<http://ieeexplore.ieee.org/stamp/stamp.jsp?arnumber=04476640>>, pp. 15-20.

\* cited by examiner

US 9,092,424 B2

WEBPAGE ENTITY EXTRACTION THROUGH JOINT UNDERSTANDING OF PAGE STRUCTURES AND SENTENCES

BACKGROUND

The World Wide Web contains huge amounts of knowledge that can provide substantial benefits to those who are able to find desired information. Information extraction is a technology directed towards the discovery and management of such web-based knowledge.

One information extraction task is directed towards extracting structured Web information of Web objects, typically comprising real-world entities including people, organizations, locations, publications, and products. Such Web object extraction can be used to understand the visual layout structure of a webpage, including for labeling the HTML elements of a page with attribute names of an entity, e.g., a business name for one entity on the page, a business address for another.

One labeling mechanism that leverages the result of understanding the page structure for use in free text segmentation and labeling is in the form of a joint model employing a Hierarchical Conditional Random Fields (HCRF) model and an extended Semi-Markov Conditional Random Fields (Semi-CRF) model. This joint model is a top-down model, in which the HCRF model determines the structure in one decision, and the Semi-CRF model makes use of this structure decision along with a suitable source of information (e.g., a gazetteer for location labeling) to make a final labeling decision.

However, there are drawbacks to this top-down technique. For example, business names are often difficult to identify on a webpage with such a model. Any improvement to the understanding of webpage content is desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an iterative and bidirectional framework processes a webpage to understand one or more entities of the webpage, e.g., to label the webpage. A text understanding component (e.g., extended Semi-CRF model) provides text-related data (e.g., text segmentation features) to a structure understanding component (e.g., extended HCRF model), which uses the text-related data and visual layout features of the webpage to identify a structure (e.g., labeled block). The text understanding component in turn uses the structure to further understand the text of the one or more entities. The text and structure data are provided iteratively to each component until a similarity stop criterion is met, at which time the webpage may be labeled based upon the text-related data and structure data.

In one implementation, the text understanding component processes text within leaf nodes of a vision tree corresponding to the webpage to provide the text-related data. Multiple mentions of a set of text may be used together, e.g., one mention of the text occurring in the labeled block, and at least one other mention occurring in a natural language sentence of the webpage.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards an integrated model for understanding webpage structures and processing text, including text in structures and in natural language sentences within the HTML elements of a webpage. As will be understood, this is accomplished via a framework that enables bidirectional integration of page structure understanding and text understanding, in an iterative manner. More particularly, in one implementation the Hierarchical Conditional Random Fields (HCRF) model that understands structure is extended to use the decision of the Semi-Markov Conditional Random Fields (Semi-CRF) model that understands text in making its structuring decision, and vice-versa, so that after some number of iterations (until a suitable stop criteria is met), more integrated page understanding results are obtained. Note that as used herein, text "understanding" is equivalent to text "segmentation" and "labeling."

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and information processing in general.

United States Patent Application Ser. No. 20080027969, and Cai, D., Yu, S., Wen, J., and Ma, W., "*VIPS: A Vision-Based Page Segmentation Algorithm*," Microsoft Technical Report, MSR-TR-2003-79, 2003, hereby incorporated by reference, describe a vision-based page segmentation ("VIPS") technique that generates a hierarchical representation of blocks of a webpage. The VIPS technique uses page layout features (e.g., client region, font, color, and size) to construct a "vision tree" for a webpage. Unlike the well-known HTML DOM (Document Object Model) tree, each node in a vision tree represents a region on the webpage. The technique identifies nodes from the HTML tag tree and identifies separators (e.g., horizontal and vertical lines) between the nodes. The technique thus creates a vision tree that has a vertex, referred to as a block, for each identified node. The hierarchical representation of the blocks can effectively keep related blocks together while separating semantically different blocks.

Figure 1:
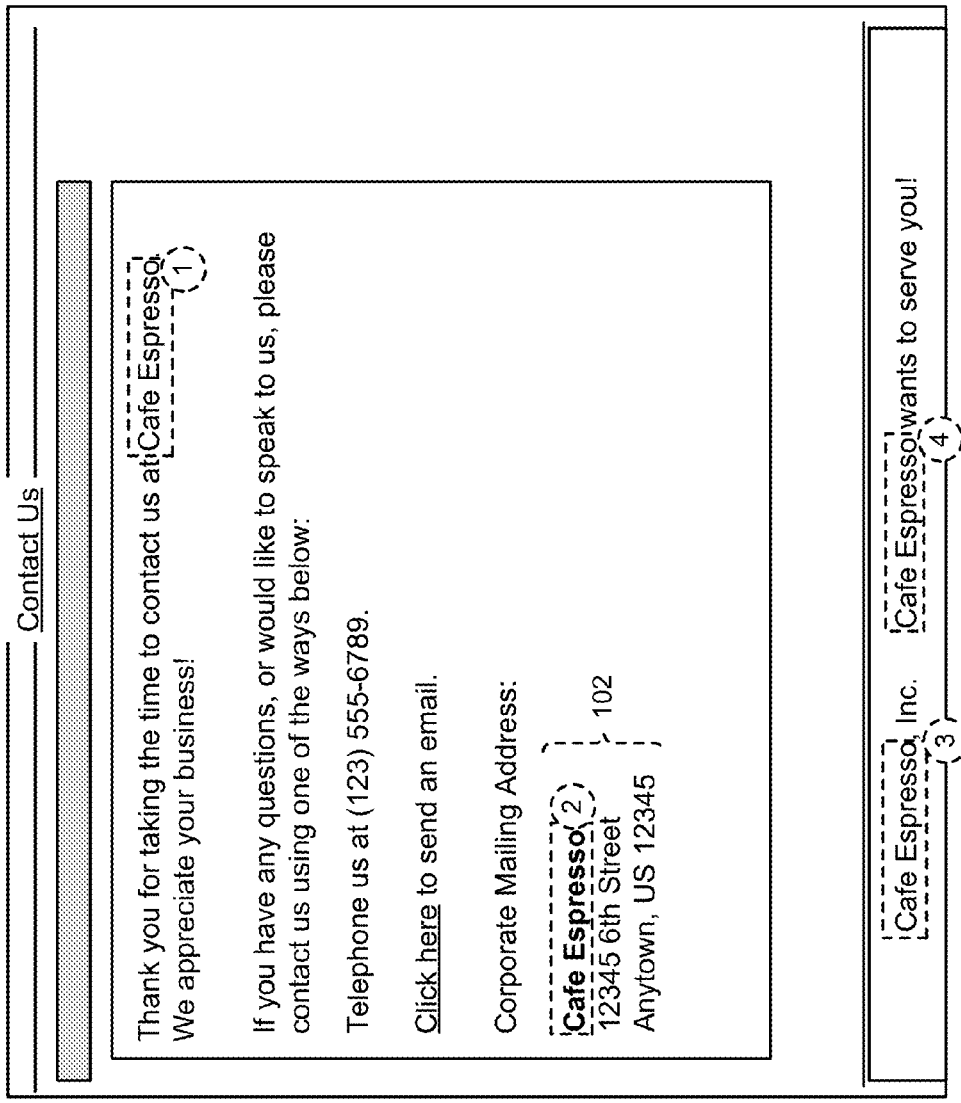
FIG. 1 is a representation of a webpage having an object block structure and multiple representations of a text string.

FIG. 1 is a representation of an example rendered webpage containing local entity information. As can be seen, the address information of a local business on the webpage in this example is regularly formatted in a visually structured block, e.g., as determined by VIPS technology, in which a first line of the block contains the business name (in bold font in this example), the second line contains the street information, and the third line contains the city, state and zip code. Such a structured block containing multiple attribute values of an object is referred to an object block 102 (as indicated by the dashed bracket). Note that any dashed representations on the page (as well as the object block label 102) are not part of the rendered page, but are provided for illustrative purposes.

In general, the known top-down HCRF algorithm and semi-CRF algorithm operate such that the object block 102 is detected first, with the attributes within the block labeled thereafter. While this technique works relatively well for extracting simple attributes like address information, it tends to perform relatively poorly on the business name attribute, (although the business name attribute is typically very important for a local search service).

The technology described herein is able to improve the labeling performance, including that of identifying the business name, in part based on a bidirectional, iterative framework for joint optimization (described below), as well as based upon the repeated occurrences of the business name on the page (as indicated by the dashed boxes/circles labeled one (1) through four (4) in FIG. 1). Note that the attributes in an object block tend to be short isolated strings; the features extracted to identify the label for such strings are rather limited making it difficult to identify business names correctly only with the structure (i.e. visual layout) information and text features of these short strings (e.g. regular expression and word emission probability). In other words, the evidence supporting the decision to label an isolated string as the business name is usually not strong enough; e.g., there is relatively little evidence for labeling "Cafe Espresso" as the business name based solely on its appearance in the object block 102.

However, in this example, the business name is mentioned multiple times in the webpage, including in natural language sentences outside the object block 102, providing additional information for labeling all of the mentions of the business name together, no matter where each appears in the webpage. Moreover, as described below, entity extraction from webpages is further improved (with or without such multiple mentions) as a result of the bidirectional, iterative framework.

By way of explanation of CRF, HCRF and semi-CRF, the linear chain CRF tags elements in a sequence x with transition features. The label of the elements in the sequence is defined by y, such that the conditional probability of y is defined as:

$$p(y \mid x) = \frac{1}{Z(x)} \phi(y \mid x), \quad (1)$$

where $Z(x) = \Sigma_y \phi(y,x)$ is the normalization factor to make it a distribution function. The potential function $\phi(y; x)$ is defined as:

$$\phi(y, x) = \exp\left[\sum_{v,k} \mu_k g_k(y \mid_v, x) + \sum_{e,k} \lambda_k f_k(y \mid_e, x)\right], \quad (2)$$

where v is a vertex corresponding to a single element and e is an edge corresponding to a pair of neighboring elements; $y\mid_v$ are the components of y associated with the vertex v and $y\mid_e$ are the components of y associated with the edge e. The k-th state function is $g_k(\bullet)$ and $f_k(\bullet)$ is the k-th transition feature function; $\mu_k$ and $\lambda_k$ are the corresponding weights of the feature functions $g_k(\bullet)$ and $f_k(\bullet)$ respectively.

Figure 2:
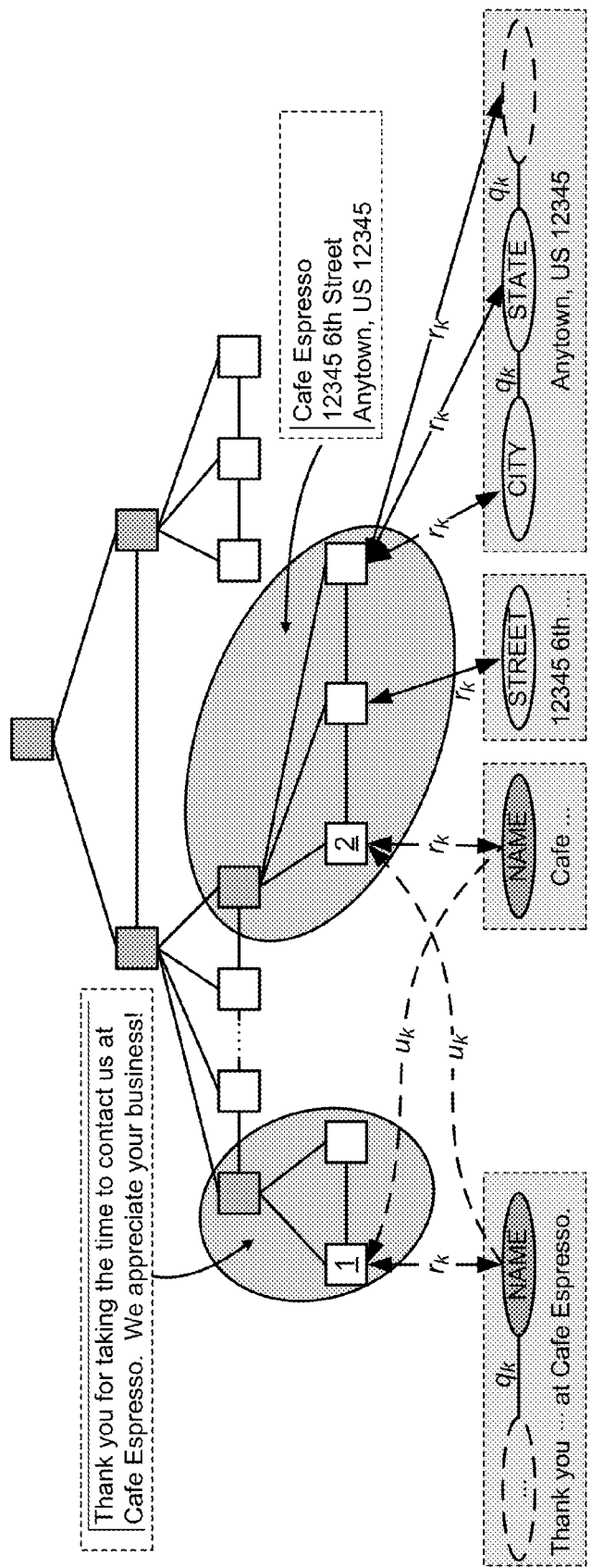
FIG. 2 is a representation of a vision tree corresponding to the example webpage of FIG. 1 that illustrates example connections between an extended HCRF model and an extended Semi-CRF model.

HCRF is an extension of the CRF model on graphs, and in general converts a vision tree representation of a webpage to a graph by introducing edges between adjacent siblings. FIG. 2 includes an example. The root node represents the webpage, and the region of the parent node is the aggregation of those of its child nodes. The leaf nodes form the most detailed flat segmentation of the webpage, and only leaf nodes have inner text content, e.g., these inner leaf nodes may contain information such as a business name. The text content may be structured text like address lines or grammatical paragraphs, which contain the attribute values of an entity.

A known junction tree algorithm is used to infer the label of the vertices on the graph. These vertices correspond to the vision nodes in the vision tree. Similar to the CRF model, the conditional distribution of the labels given the observations is defined as follows:

$$p(H \mid X) = \frac{1}{Z(X)} \phi(H, X), \quad (3)$$

where $Z(x) = \Sigma_H \phi(H,x)$ is the normalization factor to make it a distribution function, and $\phi(H,X)$ is the potential function of the label assignment H on the vision tree, having the following form:

$$\phi(H, X) = \exp\left[\sum_{v,k} \mu_k g_k(H\mid_v, X) + \sum_{e,k} \lambda_k f_k(H\mid_e, X) + \sum_{t,k} \gamma_k b_k(H\mid_t, X)\right]. \quad (4)$$

Note that v and e still represent vertex and edge respectively; t is the triangle having three vertices and three edges connecting each pair of the three vertices. As represented in FIG. 2, the shaded squares represent inner nodes and the non-shaded squares represent leaf nodes; these correspond to v. The pairs of squares connected by a solid line correspond to e. The triangles with three squares and three solid lines connecting each pair of squares correspond to t.

In the potential function $\phi(H,X)$ in equation (4), $H\mid_v$ are the components of H associated with the vertex v; $H\mid_e$ are the components of H associated with the edge e; and $H\mid_t$ are the components of H associated with the triangle t. The feature functions on the vertices, edges and triangles are $g_k(\bullet)$, $f_k(\bullet)$ and $b_k(\bullet)$ respectively; $\mu k$, $\lambda k$ and $\gamma k$ are the corresponding weights of the feature functions $g_k(\bullet)$, $f_k(\bullet)$ and $b_k(\bullet)$ respectively. Main differences between the HCRF and CRF models include the feature functions $b_k(\bullet)$ on the triangles.

Semi-CRF is an extension of the linear chain CRF. As described above, the segmentation of a text string x is $s = \{s_1, s_2, \ldots, s_m, \ldots, s\mid_s\mid\}$. Let $q_k(s_m, s_{m-1}, x)$ be the k-th feature function at segment m. The value of $q_k(s_m, s_{m-1}, x)$ depends on the current segment $s_m$, the previous segment $s_{m-1}$ and the observation of the string x. Let $\xi k$ be the weight of $q_k(\cdot)$. The conditional probability is then defined as:

$$p(s \mid x) = \frac{1}{Z(x)} \phi(s \mid x), \quad (5)$$

where $Z(x)=\Sigma_s \phi(s,x)$ is the normalization factor to make $p(s|x)$ a distribution function and the potential function $\phi(s|x)$ is:

$$\phi(s, x) = \exp\left[\sum_m \sum_k \xi_k q_k(s_m, s_{m-1}, x)\right]. \quad (6)$$

The technology described herein uses the vision tree as the data representation for the structure understanding, with $X=\{x_1, x_2, \ldots, x_i, \ldots, x_{|X|}\}$ used to denote the entire vision tree of a webpage. The observation on the i-th vision node is $x_i$, which can be an inner node or a leaf node. The observation contains both the visual information, e.g., the position of the node, and the semantic information, e.g., the text string within the node. Each vision node is associated with a label h to represent the role of the node on the whole tree, e.g., whether the node contains all or some of the attributes of an object. Thus $H=\{h_1, h_2, \ldots, h_i, \ldots, h_{|X|}\}$ represents the label of the vision tree X. The label space of h is denoted as Q.

The text string within the leaf node is represented by a character sequence. Understanding the text means to segment the text into non-overlapping pieces and tag each piece with a semantic label. To represent the segmentation and tagging over the text string within a leaf node x, $s=\{s_1, s_2, \ldots, s_i, \ldots, s_{|S|}\}$. Each segment in s is a triple, $s_m=\{\alpha_m, \beta_m, y_m\}$, in which $\alpha_m$ is the starting position; $\beta_m$ is the end position and $y_m$ is the segment label that is assigned to the characters within the segment; |x| denotes the length of the text string within the vision node x. Segment $s_m$ satisfies $0 \leq \alpha_m \leq \beta_m \leq |x|$ and $\alpha_{m+1}=\beta_m+1$. Named entities are segments that are differentiated from other segments by their labels; the label space of y is denoted as Y. The segmentation and tagging of the leaf nodes in the vision tree are denoted as $S=\{s_1, s_2, \ldots, s_i, \ldots, s_{|S|}\}$.

Given the above data representation of the page structure and text strings, the webpage understanding problem may be defined in one part as the joint optimization of structure understanding and text understanding. More particularly, given a vision tree X, joint optimization of structure understanding and text understanding attempts to find both the optimal assignment of the node labels and text segmentations (H, S)*:

$$(H, S)^* = \underset{(S,H)}{\mathrm{argmax}} p(H, S \mid X). \quad (7)$$

In the technology described herein, this definition is a primary goal of webpage understanding, i.e., the page structure and the text content are to be understood together. However, such a definition of the problem is too difficult because the search space is the Cartesian product of Q and Y. However, the negative logarithm of the posterior in (7) is a convex function, if the exponential function is used as the potential function, whereby the coordinate-wise optimization may be used to optimize H and S iteratively. In this manner, the technology described herein is in part directed towards solving two simpler conditional optimization problems instead of solving the joint optimization problem in (7) directly. In other words, structure understanding and text understanding are performed separately and iteratively. Formal definitions of the two conditional optimization problems are set forth below.

The structure understanding definition basically states that, given a vision tree X and the text segmentation and labeling results S on the leaf nodes of the tree, structure understanding attempts to find the optimal label assignment of all the nodes in the vision tree:

$$H^* = \underset{H}{\mathrm{argmax}} p(H \mid X, S). \quad (8)$$

Structure understanding thus seeks to identify the labels of the vision nodes in the vision tree. Both the raw observations of the nodes in the vision tree and the understanding results about the text within each leaf node may be used to attempt to find an optimal label assignment of the nodes on the tree.

With respect to text understanding, given a vision tree X and the label assignment H on all vision nodes, text understanding attempts to find the optimal segmentation and labeling S* on the leaf nodes:

$$S^* = \underset{S}{\mathrm{argmax}} p(S \mid X, H). \quad (9)$$

Text understanding in entity extraction attempts to identify the named entities in a webpage. The labeling results of the vision nodes constrain the text understanding component to search only part of the label space of the named entities. The labels of the named entities within a vision node are forced to be compatible with the label of the node assigned by the structure understanding.

Thus, in sum, the joint optimization problem can be solved by solving the structure understanding sub-problem and the text understanding sub-problem iteratively, starting from any reasonable initial solution. In structure understanding, the S in the condition is the optimum of the text understanding in the previous iteration, and in text understanding, the H in the condition is the optima of the structure understanding in the previous iteration. The iteration can begin with either the structure understanding or text understanding, although starting with text understanding is described herein, with the features related to the label as given by structure understanding being set as zero in the first run of text understanding. In one implementation, the loop stops when the optima in two adjacent iterations are considered close enough.

Figure 3:
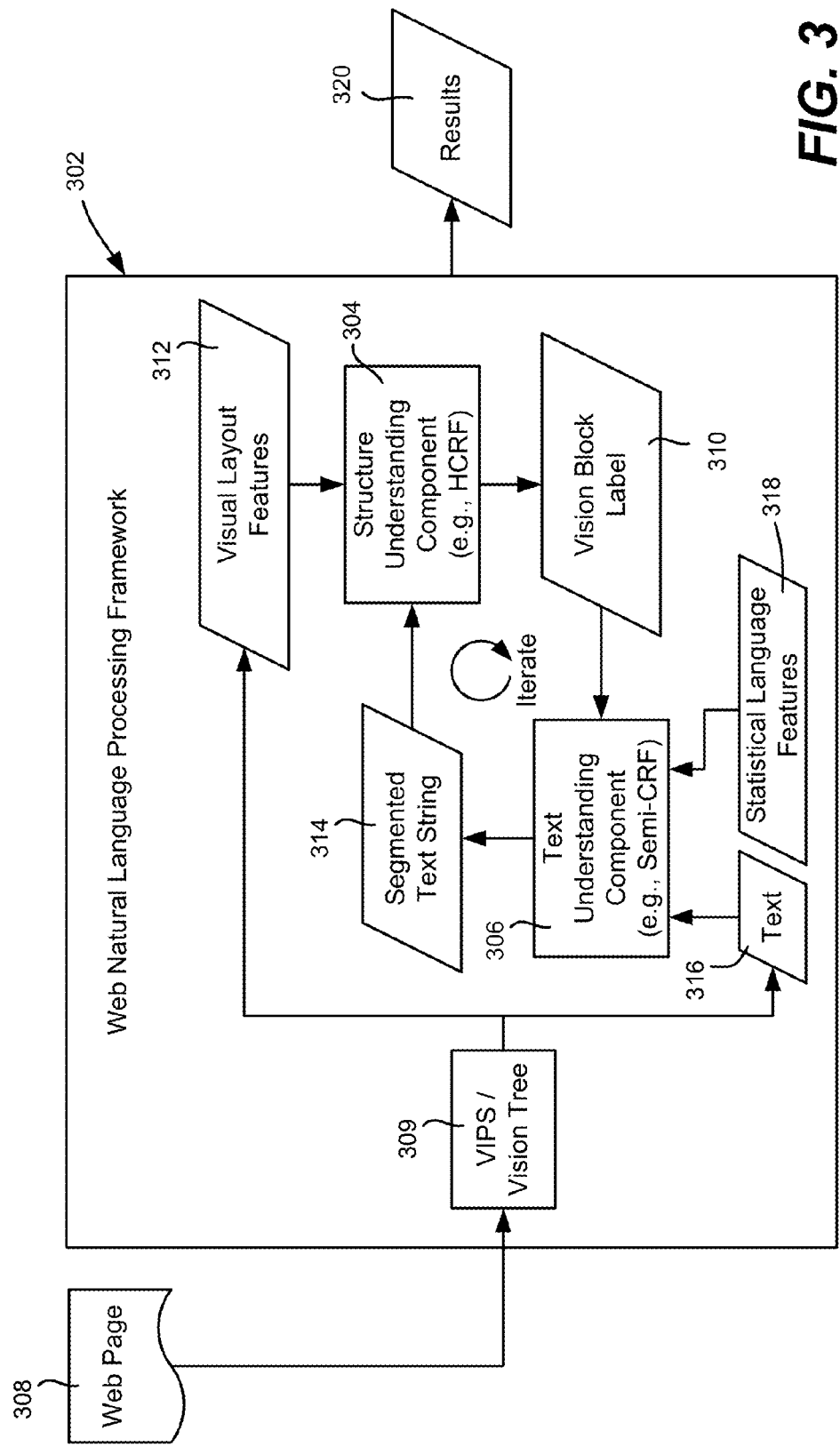
FIG. 3 is a block diagram representing example components of a natural language processing framework that may be used for labeling webpages.

Turning to FIG. 3, there is shown a web natural language processing (WebNLP) framework 302 that solves the webpage understanding problem described above. In general, the WebNLP framework 302 comprises a structure understanding component 304 and a text understanding component 306 which process a webpage 308, e.g., from some larger set of webpages. In one example implementation, the framework 302 includes or is otherwise coupled with VIPS technology 309 or the like to create the vision tree.

As can be seen from the closed iteration loop between the two components 304 and 306, the understanding results of one component may be used by the other component to make a decision. Note that where the loop begins is not significant, however as described above, one implementation starts from the text understanding component 306.

The structure understanding component 304 assigns labels 310 to the vision blocks in a webpage, considering visual layout features 312 from the webpage 308 and as well as the segments (segmented text string) 314 returned by the text understanding component 306. If the segments of the inner text are not available, the structure understanding component works without the segments (and thus may start the loop).

The text understanding component 306 segments the text (string) 314 within the vision block according to statistical language features 318 and the label 310 of the vision block assigned by the structure understanding component 304. The segmented text string 314 is iteratively fed to the structure understanding component 304 as described herein. The text understanding component 306 will work without the label of the vision block if the label is not available (and thus may start the loop).

The two components 304 and 306 run iteratively until some stop criterion is met, e.g., the optima in two adjacent iterations are close enough. At this time, results 320 are output, e.g., labels for the webpage's entities. Such iterative optimization can boost both the performance of the structure understanding component and text understanding component.

As can be seen, the HCRF model and the Semi-CRF model are extended to enable the iterative labeling process, so that the labeling decision made by HCRF on page structure understanding and the decision made by semi-CRF on free text understanding may be treated as features in both models iteratively. In the framework, the weights of the natural language features may be trained on existing large natural language processing corpus to provide suitably accurate text segmentation and labeling.

To extend the HCRF model and the Semi-CRF model so as to interact with each other, the HCRF model is extended by introducing other kinds of feature functions, which take the segmentation of the text strings as their input. To represent the feature functions having text strings segmentation input, $e_k(H|_t, X, S)$ is used. To simplify the expression, the functions defined on the triangle represent the functions defined on the vertex, edge or triangle. As the framework is iterative, the superscript j is used to indicate the decision in the j-th iteration. Then the potential function of the extended HCRF algorithm in the j-th iteration is defined as:

$$\phi(H^j, X, S^{j-1}) = \exp\left[\begin{array}{l}\sum_{v,k} \mu_k g_k(H^j|_v, X) + \\ \sum_{e,k} \lambda_k f_k(H^j|_e, X) + \\ \sum_{t,k} \gamma_k h_k(H^j|_t, X) + \\ \sum_{t,k} \chi_k e_k(H^j|_t, X, S^{j-1})\end{array}\right]. \quad (10)$$

The feature function $e_k(\bullet)$ uses the decision of the text understanding component in the (j−1)-th iteration $S_{j-1}$ as its additional input. $X_k$ is the weight of the feature function $e_k(\bullet)$. The other symbols have the same meanings as in the original HCRF model described above.

The conditional distribution function of the extended HCRF model in the j-th iteration is:

$$p(H^j \mid X, S^{j-1}) = \frac{1}{Z(X, S^{j-1})} \phi(H^j, X, S^{j-1}), \quad (11)$$

where $Z(X,S^{j-1})=\Sigma_{H^j}\phi(H^j, X, S^{j-1})$ is the normalization factor to make $p(H^j, X, S^{j-1})$ a distribution function.

The Semi-CRF model is extended by introducing both the label of the vision node and the segmentation results of the text strings within the vision nodes in the last iteration. Therefore, the potential function of the extended Semi-CRF model is:

$$\phi(X, H^j, S^{j-1}, S^j) = \exp\left[\begin{array}{l}\sum_i \sum_m \sum_k \xi_k q_k(s^j_{i,m-1}, s^j_{i,m}, x_i) + \\ \sum_i \sum_m \sum_k \theta_k r_k(s^j_{i,m-1}, s^j_{i,m}, h^j_i, x_i) + \\ \sum_i \sum_m \sum_k \eta_k u_k(s^j_{i,m-1}, s^j_{i,m}, X, S^{j-1})\end{array}\right]. \quad (12)$$

In equation (12), $q_k(\bullet)$ is the statistical language feature function that was described above with reference to the original Semi-CRF model; $r_k(\bullet)$ is the feature function considering the label of the vision node containing the text string, and $x_i$; $u_k(\bullet)$ is the global feature function, which can include the observation on the whole webpage and the text segmentation results in the last iteration. For the weights, $\xi_k$, $\theta_k$ and $\eta_k$ are the corresponding feature weights of feature functions $q_k(\bullet)$, $r_k(\bullet)$ and $u_k(\bullet)$ respectively. The conditional distribution function of the extended Semi-CRF model can be expressed as:

$$p(S^j \mid X, H^j, S^{j-1}) = \frac{\phi(S^j, X, H^j, S^{j-1})}{Z(X, H^j, S^{j-1})}, \quad (13)$$

where $Z(X, H^j, S^{j-1})=\Sigma_{S^j}\phi(S^j, X, H^j, S^{j-1})$ is the normalization factor to make it a distribution function.

To integrate the HCRF and Semi-CRF models, FIG. 2 further shows an illustrative example of the connection between the extended HCRF model and the extended Semi-CRF model in a webpage generated based on the example webpage shown in FIG. 1. There are two types of connections in the integrated model, namely the connection between the vision node label and the segmentation of the inner text, and the connection between multiple mentions of a same named entity.

The connection between the extended HCRF model and the extended Semi-CRF model is via the vision tree node and its inner text. The feature functions that connect the two models are $r_k(\bullet)$ in the extended Semi-CRF model and $e_k(\bullet)$ in the extended HCRF model. The feature function $r_k(\bullet)$ in the extended Semi-CRF model takes the labeling results of the leaf node given by the extended HCRF model as its input. For example, if a leaf node x is labeled as ADDRESS (which indicates that x contains and only contains address information), then $r_k(\bullet)$ will return a positive value only when the tagging of the text only contain labels such as CITY, STREET and ZIP. Therefore, evidence from the vision tree node is then delivered downward to the extended Semi-CRF model via function $r_k(\bullet)$.

The feature function $e_k(\bullet)$ in the extended HCRF model uses the segmentation and labeling results of the extended Semi-CRF model as its input. For example, if the text within a node is segmented to CITY, STATE and ZIP, then $e_k(\bullet)$ will return a positive value only when the potential label of the node is ADDRESS. Thus, the evidence from the underlying text is delivered upward to HCRF via the function $e_k(\bullet)$. Such connections are illustrated in FIG. 2 as the solid bidirectional arrows marked with $r_k$. Note that each bidirectional arrow represents both $r_k(\bullet)$ (downward) and $e_k(\bullet)$ (upward) between the two models.

With respect to leveraging multiple mentions of an entity, in many cases, a named entity has more than one mention within a webpage. Therefore, evidence may be collected from the different mentions of one same named entity to make a decision on these occurrences together. The evidence from the other mentions of a named entity are delivered to the vision tree node where one of the mentions of the named entity lies via feature function $u_k(\bullet)$ when the extended Semi-CRF model is working. The feature function $u_k(\bullet)$ may introduce the segmentation and labeling evidence from other occurrences of the text fragment over the current webpage. By referencing the decision $S_{j-1}$ over the text strings in the previous iteration, $u_k(\bullet)$ can determine whether the same text fragment has been labeled as an ORGANIZATION elsewhere, or whether it has been given a label other than STREET. By this mechanism, the evidence for a same named entity is shared among its occurrences within the webpage. The dashed arrows in FIG. 2 illustrate such connections. In this example, the vision node 1 and vision node 2 both contain a mention to one named entity, "Cafe Espresso" with label "NAME".

Turning to learning the parameters, given the labeling results, the extended HCRF model and the extended Semi-CRF model are independent. Therefore, the parameters of the two models can be learned separately. The two models do not interact during the parameters inference stage.

For the extended HCRF model, the parameter learning is relatively straightforward. In this model, the feature function set is relatively small. Therefore, it does not need a large number of labeled samples to train the model, e.g., on the order to hundreds of samples is typically sufficient. Note that although the potential of the extended HCRF model has an additional parameter $S_{j-i}$ compared with the original HCRF model, it still can be trained using the same method as the original HCRF model by treating $S_{j-i}$ as a part of the observation of the vision tree. For the labeled training webpages, $S_{j-i}$ is provided as the labeling result on all the text strings in the page. Then the parameter learning method for the original HCRF model is taken on the extended observation.

The parameter learning for the extended Semi-CRF model is not as straightforward as the extended HCRF model described above. The statistical language feature functions $q_k(\bullet)$ in the extended Semi-CRF model are mainly the statistics of the language elements (unigrams, bigrams and so forth), whose number is usually on the order of several million. In order to get reasonable weights for these features, in one implementation the model is trained on a language corpus that is sufficiently large to avoid bias, e.g., using on the order of tens of thousands of sentences. However, the labeled webpages for training the extended HCRF model are usually too limited for this purpose, e.g. there are usually only a few hundred manually labeled webpages; the number of sentences that can be used to train $q_k(\bullet)$ are usually only a few thousand. Notwithstanding, the number of features other than $q_k$ in the extended Semi-CRF model are relatively small, and their weights can be trained rather accurately with only a few hundred webpages.

Other than by expensive manual labeling, this unbalanced training sample situation can be resolved by introducing an auxiliary language corpus and train the weights of $qk(\bullet)$ on the corpus while training the weights of other features on the hundreds of webpages. Many labeled corpora that are large enough already exist.

The solution first trains the weights $\xi_k$ of $qk(\bullet)$ on the auxiliary corpus using the original Semi-CRF model. These weights $\xi_k$ are then fixed in the extended Semi-CRF model. Then the weights of other feature functions are learnt from the labeled webpages. A logarithmic likelihood function was defined on the training data set D as:

$$L = \sum_X \log[p(S^j \mid X, H^j, S^{j-1})] \quad (14)$$

$$= \sum_X \left\{ \begin{array}{l} \log[\phi(S^j, X, H^j, S^{j-1})] - \\ \log[Z(X, H^j, S^{j-1})] \end{array} \right\}.$$

To simplify the expression, let $c_k(s_{i,m-1}^j, s_{i,m}^j, h_i^j, X, S^{j-1})$ be the general form of the feature functions and $\delta_k$ be the general representation of the feature weights. Since $\xi_k$ is fixed after training on the auxiliary corpus, it is excluded from the concept of $\delta_k$. Then the gradient of the logarithmic likelihood over parameter $\delta_k$ is:

$$\frac{\partial L}{\partial \delta_k} = \sum_X \sum_i \left\{ \begin{array}{l} \sum_m c_k(s_{i,m-1}^j, s_{i,m}^j, h_i^j, X, S^{j-1}) - \\ \sum_m c_k(s_{i,m-1}^j, s_{i,m}^j, h_i^j, X, S^{j-1}) \\ \frac{\phi(X, H^j, S^{j-1}, S^j)}{Z(X, H^j, S^{j-1})} \end{array} \right\} \quad (15)$$

$$= \sum_X \sum_i \left\{ \begin{array}{l} \sum_m c_k(s_{i,m-1}^j, s_{i,m}^j, h_i^j, X, S^{j-1}) - \\ E(c_k, x) \end{array} \right\}$$

The superscripts j and j−1 are removed because the node and text are labeled on the training webpages. The second item $E(\bullet)$ is the expectation of the feature function $c_k$ under the current model parameters. Then the L-BFGS gradient search algorithm can be used to find the optima.

Figure 4:
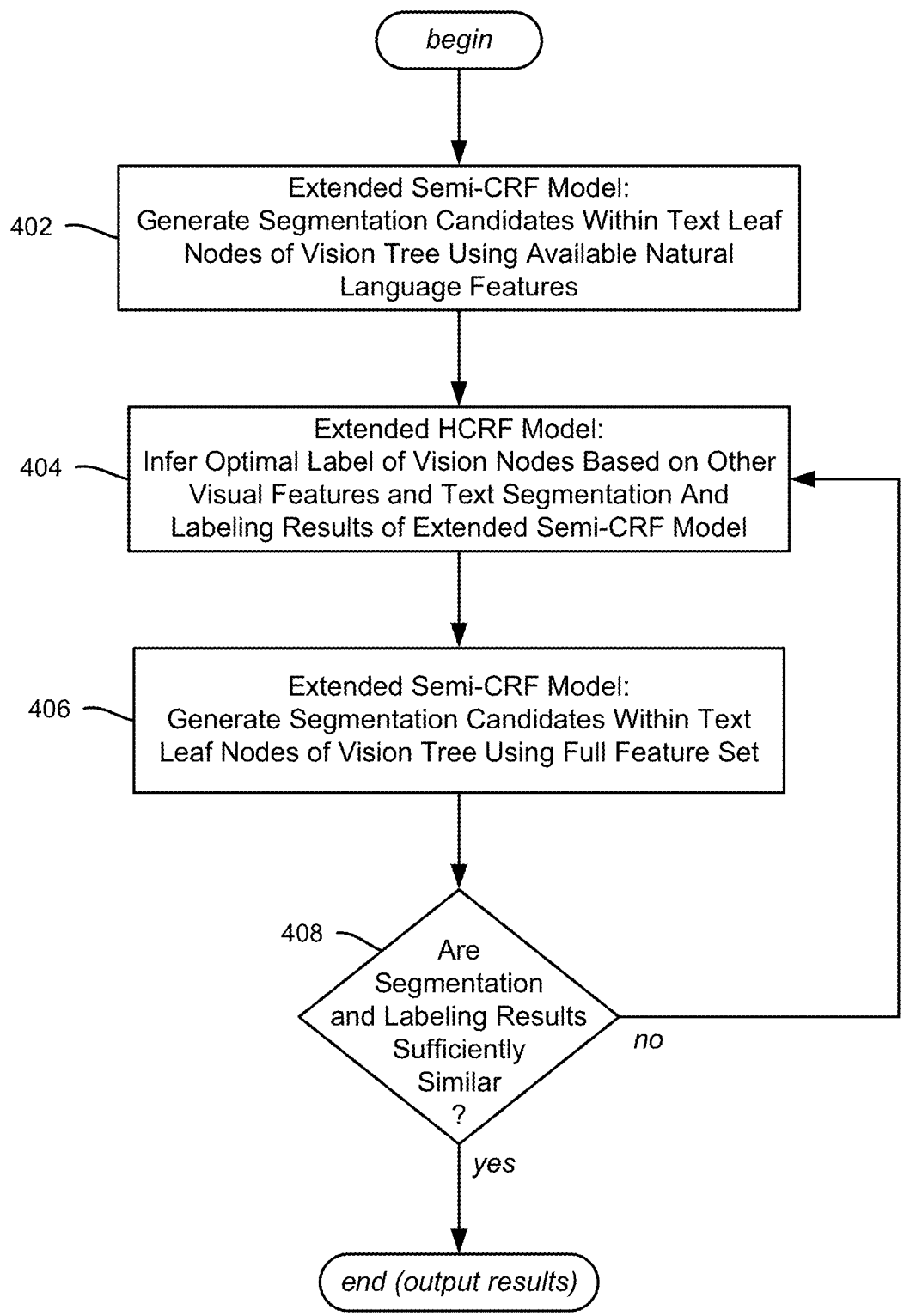
FIG. 4 is a flow diagram showing example steps that may be taken to label a webpage.

As described above, after obtaining the parameters of the models, new webpages may be processed under the WebNLP framework 302, in which the assignments of the vision nodes and the segmentations of the text are optimized iteratively. As represented in FIG. 4, the following example steps are repeated until the convergence of the assignments is reached. At step 402, the extended Semi-CRF model generates the segmentation candidates within the text leaf nodes of the vision tree using only the available natural language features. At step 404, the extended HCRF model infers the optimal label of the vision nodes based on the text segmentation and labeling results given by the extended Semi-CRF model and other visual features.

At step 406, the extended Semi-CRF model generates the segmentation candidates within the text leaf node of the vision tree using the full feature set, comprising the natural language features, the labeling results from the extended HCRF model and the multiple mention features of the same entities. Step 408 returns to step 404 to iterate, until the segmentation and labeling results are sufficiently similar in two adjacent iterations. Note that the extended Semi-CRF model is first run with only partial features to understand the text strings before running the extended HCRF model, because the language features in the extended Semi-CRF model are powerful enough to make a reasonable decision, while the visual features in the extended HCRF model alone generally cannot provide an accurate assignment.

Exemplary Operating Environment

Figure 5:
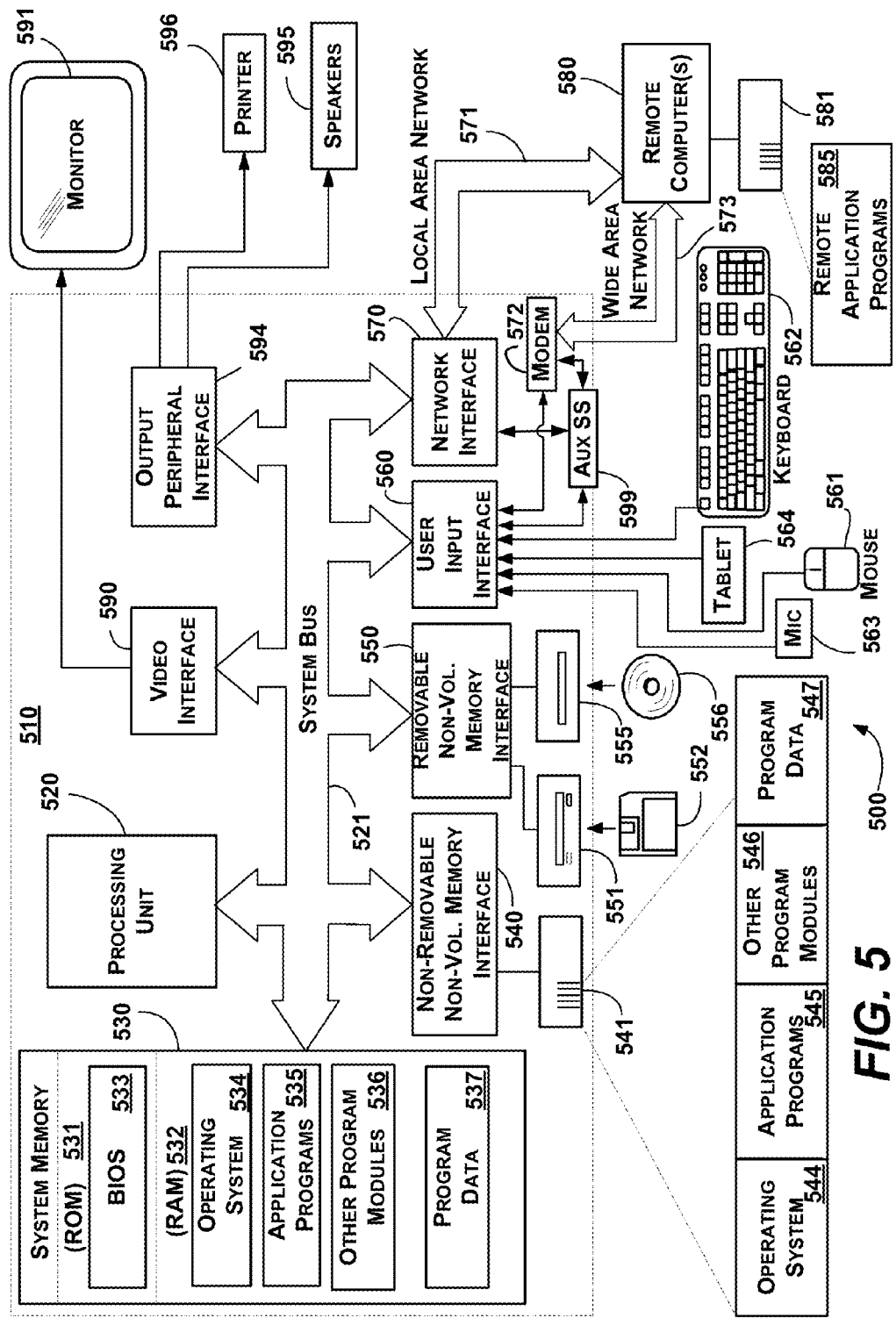
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during startup, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising;
processing a webpage to understand one or more entities of the webpage by bidirectional integration of web structure understanding and text understanding, including understanding text of the webpage into text segmentation data, using the text segmentation data of understanding the text and visual layout features of the web page to produce webpage structure information including a labeled block, and using the webpage structure information including the labeled block to further understand the text of the webpage including the one more entities, wherein understanding the text of the webpage and understanding the structure of the webpage are performed iteratively until an iteration similarity stop criterion is met.

2. The method of claim 1 wherein using the text segmentation data further comprises labeling nodes of a vision tree representing the webpage.

3. The method of claim 1 wherein understanding the text of the webpage includes processing multiple mentions of a set of text of the webpage, including at least one mention in a natural language sentence.

4. The method of claim 1 wherein using the text segmentation data comprises providing a feature to a hierarchical conditional random fields model.

5. The method of claim 1 wherein processing the webpage comprises processing a vision tree that represents the webpage, the vision tree including information that relates text and structures for use by feature functions.

6. In a computing environment, a system comprising;
at least one processor;
a computer readable storage medium communicatively coupled to the at least one processor and including components comprising;
a framework configured to process a webpage to understand one or more entities of the webpage, the framework including a text understanding component and a structure understanding component for enabling bidirectional integration of webpage structure understanding and text understanding in an iterative manner until an iteration similarity stop criterion is met, the text understanding component configured to provide text-related data to the structure understanding component for identifying a structure of the webpage, the structure understanding component configured to use the text-related data and visual layout features of the webpage to produce a labeled block, the text understanding component configured to use the labeled block to understand text of the one or more entities.

7. The system of claim 6 wherein the text understanding component is further configured to provide the text-related data to the structure understanding component as a feature comprising text segmentation information.

8. The system of claim 6 wherein the structure understanding component is further configured to process a vision tree corresponding to the webpage to produce the labeled block.

9. The system of claim 6 wherein the text understanding component processes text within leaf nodes of a vision tree corresponding to the webpage to provide the text-related data.

10. The system of claim 9 wherein one mention of a set of text occurs in the labeled block, and at least one other mention of the set of text occurs in a natural language sentence of the webpage.

11. The system of claim 6 wherein the structure understanding component comprises a hierarchical conditional random fields model.

12. The system of claim 6 wherein the text understanding component comprises a semi-conditional random fields model.

13. The system of claim 6 wherein the text understanding component is further configured to segment text of the labeled block based upon statistical language features.

14. The system of claim 6 wherein the text understanding component is further configured to provide the text-related data to the structure understanding component and the structure understanding component is further configured to produce the labeled block for use by the text understanding component over a plurality of iterations.

15. The system of claim 6 wherein the text understanding component is further configured to detect multiple mentions of an entity.

16. The system of claim 6 wherein the framework is further configured to output results comprising labels for the one or more entities of the webpage.

17. One or more computer-readable storage media having computer-executable instructions, which when executed perform steps to process a webpage to understand one or more entities of the webpage by bidirectional integration of web page structure understanding and text understanding, comprising:

(a) generating text segmentation data based on natural language data of the web page and, when available, webpage structure data including a labeled block;

(b) producing webpage structure data including the labeled block based on visual layout features of the webpage and the text segmentation data;

(c) repeating steps (a) and (b) until an iteration similarity stop criterion is met.

18. The one or more computer-readable storage media of claim 17 wherein step (a) is executed before step (b) to generate the text segmentation data including when no webpage structure data is yet available.

19. The one or more computer-readable storage media of claim 17 wherein generating the text segmentation data includes using multiple mentions of a set of text, including a mention in natural language data and a mention within a structure identified within the webpage structure data.

20. The one or more computer-readable storage media of claim 17 having further computer-executable instructions, comprising, after the iteration similarity stop criterion is met, using the text segmentation data and webpage structure data to label the webpage.

\* \* \* \* \*